(12) United States Patent
Bratcher

(10) Patent No.: US 7,805,958 B2
(45) Date of Patent: Oct. 5, 2010

(54) PORTABLE AIR CONDITIONER

(76) Inventor: Martin Bratcher, 23898 Via Madrid, Murrieta, CA (US) 92562

( * ) Notice: Subject to any disclaimer, the term of this patent is extended or adjusted under 35 U.S.C. 154(b) by 521 days.

(21) Appl. No.: 11/475,487

(22) Filed: Jun. 26, 2006

(65) Prior Publication Data

US 2007/0000277 A1   Jan. 4, 2007

Related U.S. Application Data

(60) Provisional application No. 60/695,081, filed on Jun. 29, 2005.

(51) Int. Cl.
F25D 3/02   (2006.01)

(52) U.S. Cl. .............. 62/420; 62/421; 62/426

(58) Field of Classification Search ............. 62/406, 62/420, 421, 457.1, 426
See application file for complete search history.

(56) References Cited

U.S. PATENT DOCUMENTS

| | | | |
|---|---|---|---|
| 2,162,538 A | | 6/1939 | Peo |
| 2,802,347 A | * | 8/1957 | Marcus ........................ 62/244 |
| 3,961,496 A | * | 6/1976 | Ku ................................ 62/459 |
| 4,468,932 A | * | 9/1984 | Bullard ........................ 62/421 |
| 5,024,065 A | | 6/1991 | Barrett |
| 5,197,301 A | | 3/1993 | Holcomb |
| 5,251,460 A | * | 10/1993 | DeMarco et al. .............. 62/371 |
| 5,560,219 A | * | 10/1996 | Vegara ......................... 62/241 |
| 5,953,931 A | * | 9/1999 | Brittain ........................ 62/272 |
| 6,027,137 A | * | 2/2000 | Rura .......................... 280/650 |
| 6,336,341 B1 | * | 1/2002 | McGraw et al. ............... 62/420 |
| 6,378,325 B1 | * | 4/2002 | Yang ......................... 62/457.6 |
| 6,401,483 B1 | * | 6/2002 | Kopp ........................... 62/420 |
| 6,409,206 B1 | * | 6/2002 | Willrich ..................... 280/658 |
| 6,439,521 B1 | * | 8/2002 | Wilson et al. ............ 248/227.3 |
| 6,568,202 B1 | | 5/2003 | Hodges |
| 6,571,568 B1 | | 6/2003 | Link |
| 6,571,574 B1 | * | 6/2003 | Blackstone .................. 62/420 |
| 6,886,360 B1 | | 5/2005 | Rosenbaum |
| 7,013,670 B2 | * | 3/2006 | Gonzalez et al. ........... 62/457.1 |
| 7,150,162 B1 | * | 12/2006 | Brunner ....................... 62/306 |
| 7,188,489 B2 | * | 3/2007 | Martello ...................... 62/420 |
| 7,246,505 B2 | * | 7/2007 | Navedo et al. ................ 62/420 |
| 2003/0218306 A1 | * | 11/2003 | Dixon et al. ............. 280/47.38 |
| 2004/0107711 A1 | * | 6/2004 | Sastry ....................... 62/176.5 |
| 2004/0118141 A1 | * | 6/2004 | Kim et al. ..................... 62/258 |
| 2005/0150251 A1 | | 7/2005 | Navedo |
| 2005/0269802 A1 | | 12/2005 | Kumar |
| 2006/0032265 A1 | * | 2/2006 | Shaw ........................... 62/420 |

* cited by examiner

*Primary Examiner*—Melvin Jones
(74) *Attorney, Agent, or Firm*—Dennis W. Beech

(57) ABSTRACT

The present invention may be used for cooling generally enclosed spaces. An enclosure having an air flow duct intermediate two spaced apart cooled material compartments may have a first wall having apertures therein and a second wall having apertures therein separating the air flow duct from the two spaced apart cooled material compartments. The enclosure may have a top, a bottom, two side walls, an air port end wall having a port therein in fluid communication between the enclosure exterior and the air flow duct, and a fan end wall having a fan port therein in fluid communication between the enclosure exterior and the air flow duct. A fan may be attached to the fan end wall across the fan port. A cooled material may be disposed in the two spaced apart cooled material compartments and a power source may be connected to the fan.

10 Claims, 3 Drawing Sheets

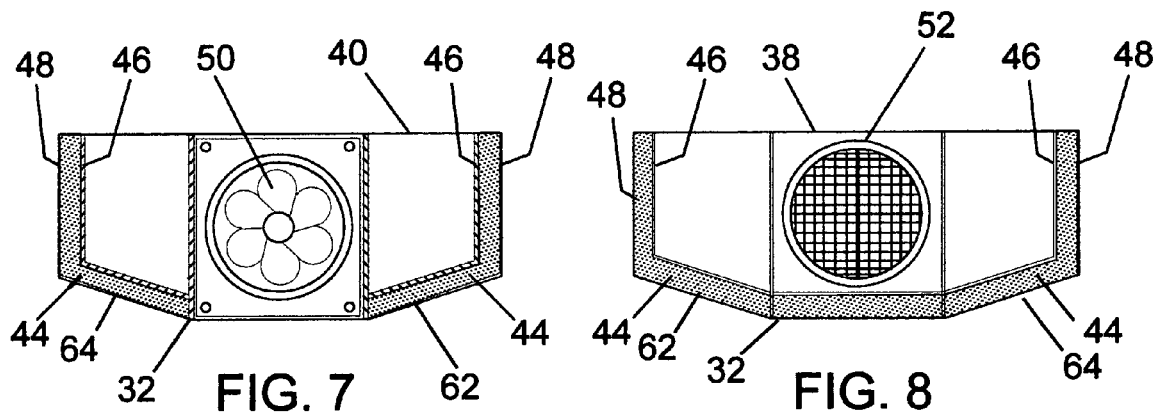
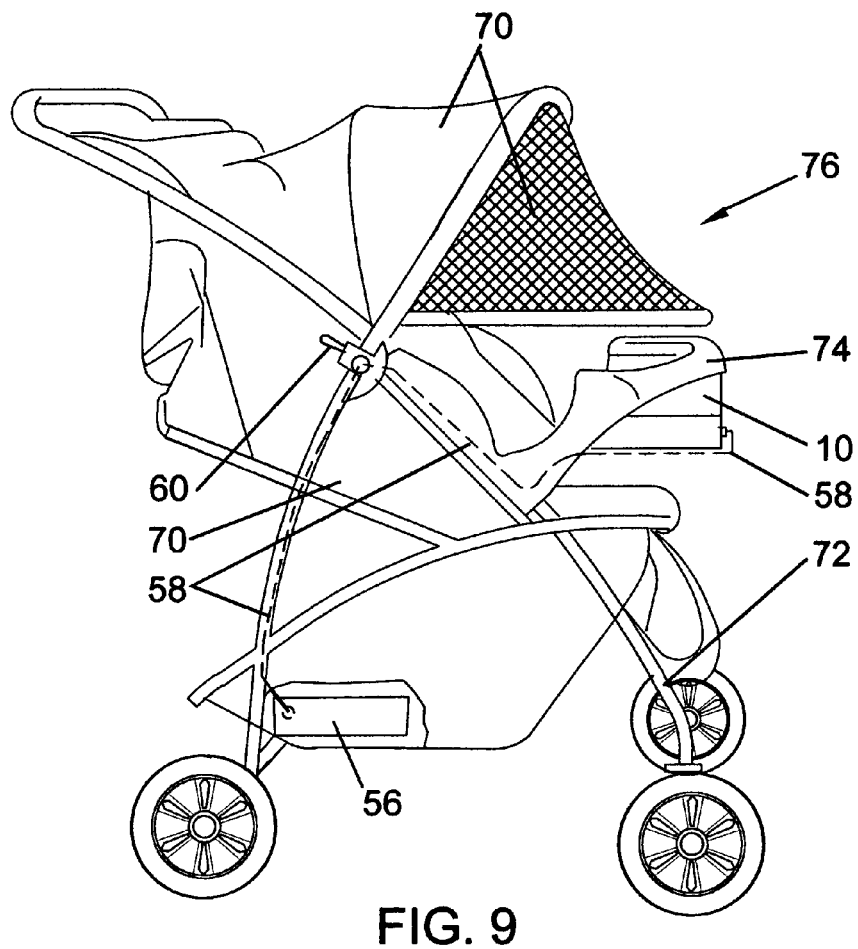

PORTABLE AIR CONDITIONER

This application claims the benefit of Provisional Application No. 60/695,081, Filed on Jun. 29, 2005.

BACKGROUND OF THE INVENTION

The invention relates to apparatus that may use ice or freezable material for cooling generally enclosed spaces. The new air conditioning apparatus may be relatively small and portable for use in cooling individual, generally enclosed spaces or relatively small spaces, for example, child vehicles or strollers, small automobiles, tents and other small enclosed spaces.

Small portable cooling apparatus may be known that use containers that may be at least partially filled with a frozen material, such as ice, or relatively cold material. These apparatus may have a fan or other means to circulate air over the frozen material or to circulate air over a heat transfer structure, such as fins, a heat transfer tower, or a radiator.

SUMMARY OF THE INVENTION

The present invention is directed to apparatus for cooling generally enclosed spaces. An enclosure having an air flow duct intermediate two spaced apart cooled material compartments may have a first wall having apertures therein and a second wall having apertures therein separating the air flow duct from the two spaced apart cooled material compartments. The enclosure may have a top, a bottom, two side walls, an air port end wall having a port therein in fluid communication between the enclosure exterior and the air flow duct, and a fan end wall having a fan port therein in fluid communication between the enclosure exterior and the air flow duct. A fan may be attached to the fan end wall across the fan port. A cooled material may be disposed in the two spaced apart cooled material compartments and a power source may be connected to the fan.

These and other features, aspects and advantages of the present invention will become better understood with reference to the following drawings, description and claims.

BRIEF DESCRIPTION OF THE DRAWINGS

FIG. 7 illustrates a cross-section view taken laterally across an apparatus viewing the fan end according to an embodiment of the invention;

FIG. 8 illustrates a cross-section view taken laterally across an apparatus viewing an air port end according to an embodiment of the invention;

FIG. 9 illustrates an elevation view of a child stroller having a canopy and an air conditioning apparatus according to an embodiment of the invention.

DETAILED DESCRIPTION

Figure 1:
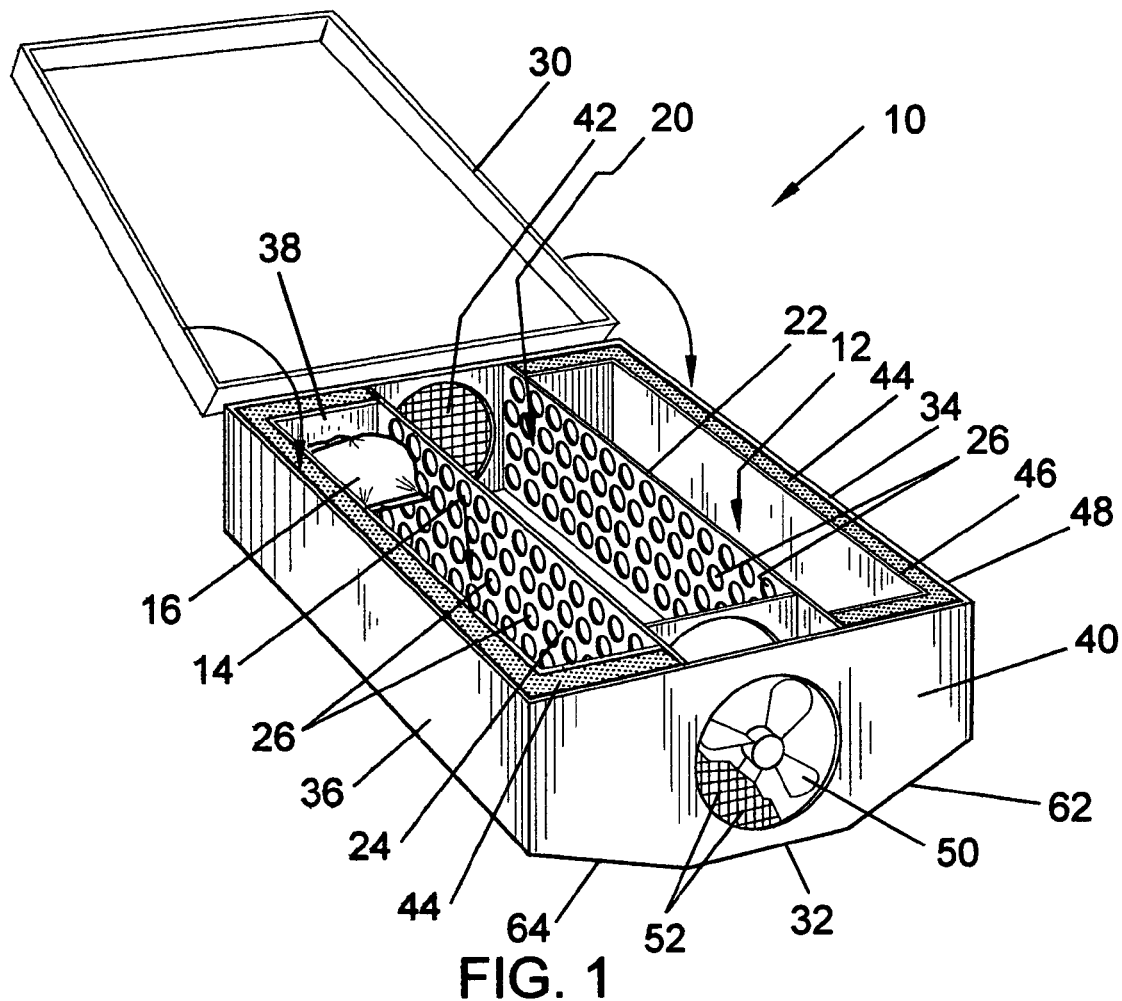
FIG. 1 illustrates a top perspective view of an apparatus according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 8, an air conditioner 10 may have an enclosure with three compartments of which two compartments 12, 14 may have a reduced temperature material or cooled material 16, for example, ice, frozen gel material or the like, inserted, and one compartment may be an air flow duct 20. The two cooled material compartments 12, 14 may be positioned on each side and generally parallel to the air flow duct 20. The cooled material compartments 12, 14 may be separated from the air flow duct 20 by walls 22, 24 that may have multiple apertures 26 therein to allow mixing of cool air from the cooled material 16 and ambient air from the environment in which the air conditioner 10 is located.

The air conditioner 10 may be a generally rectangular box shape structure having a top 30 or cover, a bottom 32 and four side walls 34, 36, 38, 40. The two side walls 34, 36 may be longer than the two end walls 38, 40. The two end walls 38, 40 may have ports 42 to allow air to flow into and out of the air flow duct 20. A fan 50 may be attached to an end wall 40 position across the port 42 in the fan end wall 40. The top 30, bottom 32, and four side walls 34, 36, 38, 40 may have an insulation material 44, such as a foam insulation attached thereto and the air conditioner may be covered by a thick fabric material 45. The top 30, bottom 32 and four side walls may also have a double wall structure with the insulation material positioned between an interior wall structure 46 and exterior wall structure 48.

The top 30 may be a removable cover to allow access to the interior of the air conditioner 10 to for example insert cooled material 16 in the cooled material compartments 12, 14, to allow removal of material, to allow cleaning and the like. The top 30 may be hinged to a side wall 34, 36, 38, 40, and may be held by fasteners, for example, hook and loop material, a catch, a clasp or the like. The fan 50 may have a protective cover 52 that may be a mesh or screen type material to prevent a person from putting a finger through port 42 into the fan 50. Depending on the size of the mesh, the protective cover 52 may also screen debris from entering the air flow duct 20. A protective cover 52 may be attached to the air port end wall 38.

Figure 2:
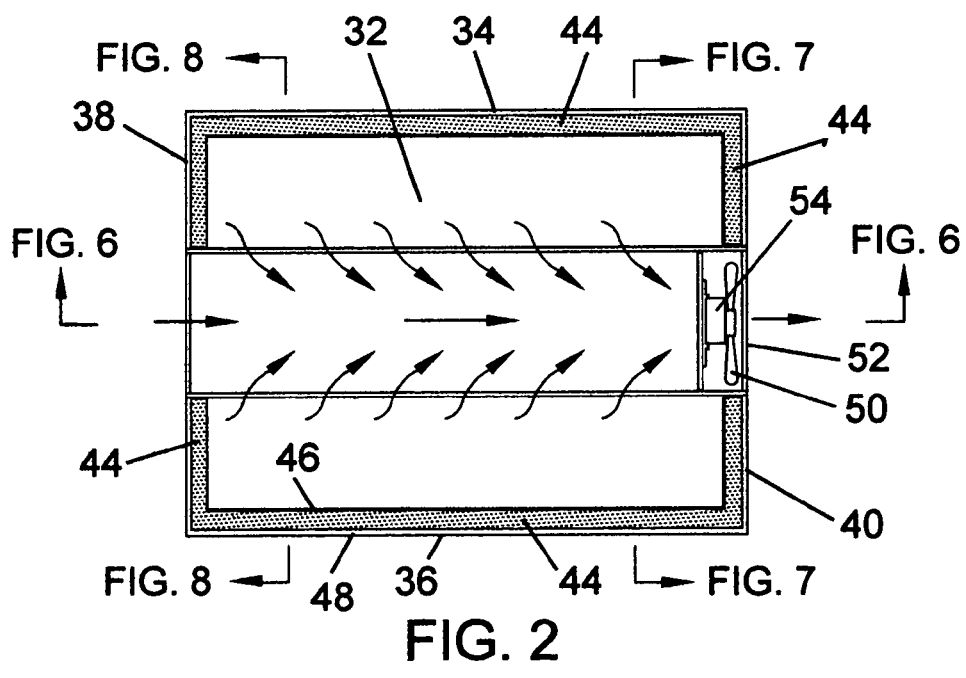
FIG. 2 illustrates a top view with the cover removed of an apparatus according to an embodiment of the invention.
Figure 3:
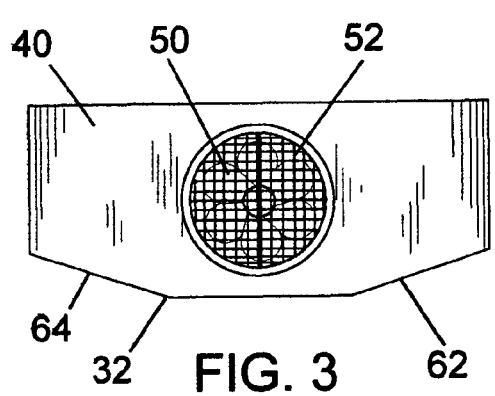
FIG. 3 illustrates a fan end view of an apparatus according to an embodiment of the invention.
Figure 4:
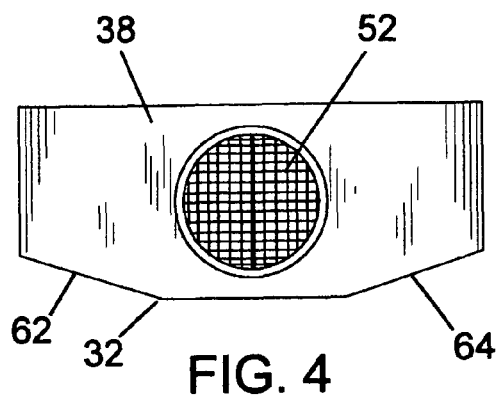
FIG. 4 illustrates an air port end view of an apparatus according to an embodiment of the invention.
Figure 5:
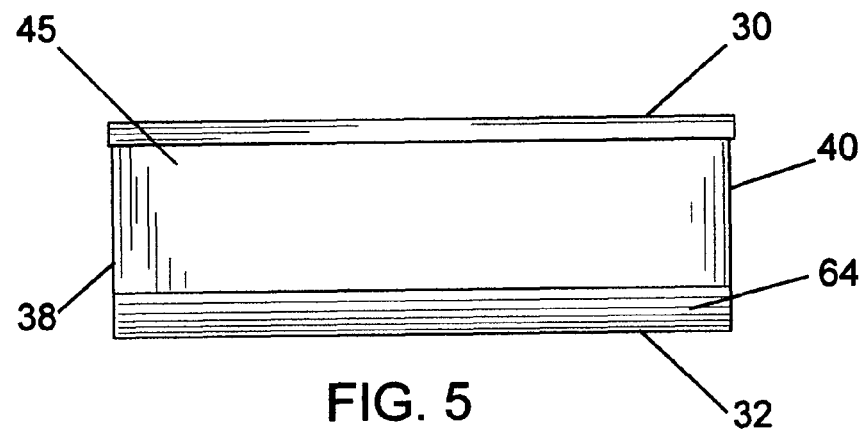
FIG. 5 illustrates a side elevation view of an apparatus according to an embodiment of the invention.
Figure 6:
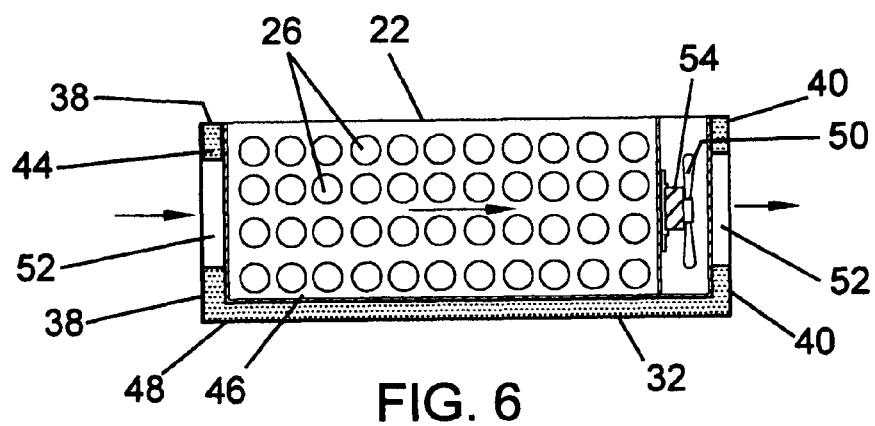
FIG. 6 illustrates a cross-section view taken along the centerline of an air duct of an apparatus according to an embodiment of the invention.

Referring to FIGS. 1, 2 and 9, in operation, the fan 50 may have an electric motor 54 connected to a power source 56 by wiring 58. The power source 56 may be a stand alone battery, a battery of an automobile that may be connected through a cigarette lighter, a solar power cell or the like. Application of power may be controlled by a switch 60. The fan may be connected to the power source 56 to rotate to draw ambient air through port 42 in the air port end wall 38 to mix with cooled air through apertures 26 with the mixture exiting the air flow duct 20 through port 42 in the fan end wall 40. Alternatively, the fan 50 may rotate to draw ambient air through the port 42 and fan 50 at the fan end wall 40 to then mix with cooled air with the mixture then exiting the port 42 at the air port end wall 38.

The bottom 32 is illustrated as having two upward sloped portions 62, 64. This slope may be useful for a child stroller 72 application to allow more room for a childs legs. Shapes other than a rectangular box may be used depending on the application. In the stroller 72 application a canopy 70 may be attached at the front portion 76 of a stroller 72 to from a generally enclosed space for efficiency in cooling a user. The air conditioner 10 may be attached under a tray 74.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for cooling generally enclosed spaces comprising:
    an enclosure having an air flow duct adjacent a cooled material compartment wherein there is a wall separating said air flow duct from said cooled material compartment and said wall having a plurality of apertures therein;
    said enclosure comprising a top, a bottom, two side walls, an air port end wall having a port therein in fluid communication between an enclosure exterior and a first end of said air flow duct, and a fan end wall having a fan port therein in fluid communication between said enclosure exterior and a second end of said air flow duct wherein a fan is attached to said fan end wall across said fan port; and
    a cooled material disposed in said cooled material compartment and a power source connected to said fan.

2. An apparatus for cooling generally enclosed spaces comprising:
    an enclosure having an airflow duct intermediate two spaced apart cooled material compartments wherein there is a first wall and a second wall separating said air flow duct from said two spaced apart cooled material compartments and said first wall and said second wall each having a plurality of apertures therein;
    said enclosure comprising a top, a bottom, two side walls, an air port end wall having a port therein in fluid communication between an enclosure exterior and a first end of said air flow duct, and a fan end wall having a fan port therein in fluid communication between said enclosure exterior and a second end of said airflow duct wherein a fan is attached to said fan end wall across said fan port; and
    a cooled material disposed in said two spaced apart cooled material compartments and a power source connected to said fan.

3. The apparatus as in claim 2 wherein said enclosure having an insulation material disposed adjacent to said top, said bottom, said two side walls, said air port end wall and said fan end wall.

4. The apparatus as in claim 3 wherein said enclosure is covered by a thick fabric material.

5. The apparatus as in claim 2 wherein said top, said bottom, said two side walls, said air port end wall and said fan end wall are of a double wall structure with insulation material disposed between said double wall structure.

6. The apparatus as in claim 2 wherein said top is removably attached to said two side walls, said air port end wall and said fan end wall.

7. The apparatus as in claim 2 wherein said bottom having a sloped portion adjacent each of said two side walls.

8. The apparatus as in claim 2 wherein a protective cover is attached across said fan adjacent said fan port.

9. The apparatus as in claim 2 wherein said fan is rotated by an electric motor that is connected to said power source and is controlled by a switch.

10. The apparatus as in claim 9 wherein said enclosure is attached under a tray of a stroller to direct cool air flow toward a user, a battery is disposed in said stroller and connected to said electric motor by an electrical wiring, and
    a canopy is disposed and attached to a generally front portion of said stroller.

* * * * *